United States Patent
Swann (10) Patent No.: US 9,399,521 B2
(45) Date of Patent: *Jul. 26, 2016

(54) AIRCRAFT VAPOUR TRAIL CONTROL SYSTEM

(71) Applicant: ROLLS-ROYCE PLC, London (GB)

(72) Inventor: Peter Swann, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,823

(22) Filed: Mar. 31, 2015

(65) Prior Publication Data

US 2015/0284102 A1 Oct. 8, 2015

(30) Foreign Application Priority Data

Apr. 2, 2014 (GB) .................................. 1405894.5

(51) Int. Cl.
*G06F 7/00* (2006.01)
*B64D 31/06* (2006.01)
*B64D 33/04* (2006.01)

(52) U.S. Cl.
CPC ............... *B64D 31/06* (2013.01); *B64D 33/04* (2013.01)

(58) Field of Classification Search
CPC .... B64D 31/06; B64D 33/04; F05D 220/323; F05D 2270/08; F02C 9/28; F02C 9/42; B64C 15/12; F02K 1/0008
USPC ............. 701/3, 100; 60/39.24, 645, 648, 440; 429/440
See application file for complete search history.

(56) References Cited

U.S. PATENT DOCUMENTS

| | | | | |
|---|---|---|---|---|
| 5,224,663 A | * | 7/1993 | Criswell | .................. B64D 5/00 244/1 R |
| 5,927,655 A | | 7/1999 | Larramendy et al. | |
| 7,550,218 B2 | * | 6/2009 | Hoffjann | ................ B01D 53/02 429/440 |
| 2002/0007816 A1 | * | 1/2002 | Zur Loye | .................. F02B 1/04 123/295 |

(Continued)

FOREIGN PATENT DOCUMENTS

WO 2012148398 A1 11/2012

OTHER PUBLICATIONS

Oct. 14, 2014 Search Report issued in British Application No. GB1405894.5.

*Primary Examiner* — Mcdieunel Marc
(74) *Attorney, Agent, or Firm* — Oliff PLC (57) ABSTRACT

The invention concerns an aircraft propulsion control system for an aircraft with a plurality of gas turbine engines mounted at different spaced positions relative to an airframe. One or more sensor is arranged to sense a condition indicative of vapor trail formation by an exhaust flow from one or more of the plurality of engines. A controller is arranged to be responsive to thrust demand for the aircraft and selectively to control each of the engines so as to modify the exhaust flow of at least one engine relative to at least one further engine according to the positions of the engines on the airframe. The proximity of an engine to a vortical wake flow created by the airframe may be used to determine suitable exhaust flow modifications. The controller may output a separate throttle control signal to each engine and/or may adjust the fuel composition supplied to each engine.

18 Claims, 5 Drawing Sheets

(56) References Cited

U.S. PATENT DOCUMENTS

| | | | |
|---|---|---|---|
| 2003/0205641 A1* | 11/2003 | McElroy | B64C 39/024 244/53 R |
| 2010/0043443 A1* | 2/2010 | Noppel | F01D 25/30 60/772 |
| 2010/0100262 A1 | 4/2010 | Blanvillain et al. | |
| 2010/0122519 A1 | 5/2010 | Epstein et al. | |
| 2010/0132330 A1* | 6/2010 | Noppel | F01D 25/30 60/39.5 |
| 2010/0288367 A1* | 11/2010 | Pursifull | B60K 15/03006 137/2 |
| 2011/0184623 A1 | 7/2011 | De Boer | |
| 2015/0100219 A1* | 4/2015 | Swann | F02C 9/28 701/100 |
| 2015/0100220 A1* | 4/2015 | Swann | F02C 3/20 701/100 |
| 2015/0284101 A1* | 10/2015 | Swann | B64D 31/06 701/3 |

\* cited by examiner

AIRCRAFT VAPOUR TRAIL CONTROL SYSTEM

BACKGROUND OF THE INVENTION

The present invention relates to aircraft propulsion systems, and more particularly to control systems for mitigating contrail formation.

Contrails, also known as condensation trails or vapour trails, are line-shaped ice-clouds that appear behind aircraft under certain circumstances. The formation of a contrail depends on a number of factors, including: ambient temperature, humidity and pressure; the efficiency of the aircraft's engines; and the properties of the fuel burned in the engines.

A contrail, once formed, will typically dissipate within a minute or so, unless the ambient air is supersaturated with respect to ice, in which case the contrail may persist. A persistent contrail will grow over time to resemble natural cirrus cloud, both in size and optical properties, and is referred to as "contrail-cirrus". Line-shaped contrails and contrail-cirrus are collectively referred to as "aviation-induced cloudiness" (AIC). Contrail-cirrus is thought to cause a majority of the climate impact of AIC due to it being spatially-larger and longer-lived than non-persistent line-shaped contrails.

Depending on the metric employed, the climate-warming impact of aviation-induced cloudiness may be of a similar magnitude to that of the $CO_2$ emitted by aircraft, and may therefore represent a significant element of aviation's total climate impact. The control of contrail formation and/or contrail properties, and particularly the reduction of the impact of persistent contrails, therefore represents a compelling opportunity for a significant reduction in the overall climate warming impact of aviation.

However a number of potential techniques for suppression of contrail formation by a gas turbine engine require the use of bespoke equipment and/or materials that are additional to those required for conventional engine operation. Any weight and/or energy penalties incurred in order to achieve contrail suppression require careful scrutiny to determine whether such penalties outweigh the possible contrail reduction benefits on climate impact.

Another method of potentially reducing the negative impact of contrail formation is to route aircraft around/above/below regions of air susceptible to contrail formation and/or persistence. However, in addition to the added complexity for air traffic control and pilots, the re-routing of aircraft away from predetermined flight paths will cause increased fuel burn, not only by increasing duration and distance travelled, but also by causing departure from optimal cruise conditions of the aircraft engines.

It is therefore an object of the present invention to manage the formation and/or characteristics of aircraft engine exhaust contrails in a manner that reduces negative impact on the climate. It may be considered an additional or alternative aim to provide a system for aircraft engine contrail mitigation which bears minimal weight penalty.

BRIEF SUMMARY OF THE INVENTION

According to a first aspect of the invention there is provided an aircraft propulsion control system comprising: a plurality of gas turbine engines mounted at different spaced positions relative to an airframe; one or more sensor arranged to sense a condition indicative of a property of a vapour trail formed by an exhaust flow from one or more of the plurality of engines; and a controller arranged to be responsive to said sensed condition and a thrust demand for the aircraft and to control operation of each of the engines so as to modify the exhaust flow of at least one engine relative to at least one further engine according to the positions of the engines on the airframe.

The present invention is beneficial because different portions of the airframe will induce different contributions to the wake caused by the aircraft. It has been found that the location of the engine exhaust flow relative to certain portions or flow phenomena of the aircraft wake can reduce a vapour trail characteristic compared to other locations on the airframe. The invention may reduce the optical depth of one or more vapour trail formed by engine exhaust flow. The invention may reduce the net/collective optical depth for the plurality of aircraft engines, e.g. by reducing optical depth on at least one engine whilst possibly increasing optical depth on one or more further engine, but typically by a lesser magnitude.

The airframe may have a centreline or central plane and may be generally symmetrical there-about. At least one engine may be offset or laterally spaced from the centreline by a greater distance than at least one further engine.

It has been found that the entrainment/mixing of engine exhaust flow into a vortical region of the airframe wake in particular can have a beneficial impact on a resulting vapour trail characteristic. Accordingly the airframe may comprise both vortical and non-vortical wake producing portions. The controller may control operation of an engine according to its proximity to a vortical wake producing portion of the airframe, and/or according to the extent to which the engine's exhaust flow interacts with a vortical wake produced by the aircraft or by a portion thereof.

Whilst it will be appreciated by the skilled person that any turbulent wake flow will have vortices therein, the magnitude or radial length scale of a vortex will determine whether it affects the global/macroscopic flow regime. The use of the term vortical flow herein refers to a flow regime/region in which the vortex dominates the flow regime such that the macroscopic flow rotates about a vortex core. In a secondary wake flow region, the radial length scale of individual vortices therein is smaller and the vortices are generally randomly oriented such that they do not induce a macroscopic vortical flow.

The invention is particularly advantageous for relatively low levels of ice super-saturation of ambient air. For example the invention may be used where the relative humidity with respect to ice is greater than but relatively close to 100%, for example in the region 100-120% or else less than 130% or 140%. One or more ambient sensor may be used for such a determination.

The airframe typically comprises at least one aerofoil or wing extending away from the airframe centreline towards a tip, e.g. so as to define a span dimension. At least one engine may be located closer to an aerofoil or wing tip than at least one further engine.

The controller may adjust the soot emissions of one or more engine at a greater distance from a vortical wake flow region in an opposite sense to one or more engine that is closer to a vortical wake flow region. The controller may reduce the soot emissions of one or more engine at a greater distance from a vortical wake flow region and/or increase the soot emissions of one or more engine that is closer to a vortical wake flow region.

The airframe typically comprises three or more engines. The airframe may comprise at least four engines. The controller may modify the exhaust flow of each of a subset of the engines relative to a further subset of the engines.

The controller may modify the content and/or flow rate of at least one engine exhaust flow. The controller may modify the efficiency of one or more engine so as to alter the engine exhaust flow, or vice versa.

The controller may be arranged to control an engine operation variable, e.g. a combustion variable, so as to modify the engine exhaust flow. The engine operation variable may comprise any or any combination of a thrust, throttle, fuel flow (e.g. a fuel flow rate and/or fuel composition) and/or fuel/air ratio setting or else an operation variable which impacts one or more of said settings. The controller may increase the operation variable of one or more engine whilst concurrently decreasing the operation variable of one or more further engine. The operation variable may correspond to or display a known/direct relationship with thrust, for example such that the operation variable provides an indicator of, or proxy for, thrust.

The operation variable may affect/vary the combustion process within the engine. The operation variable may correspond to or display a known/direct relationship with engine soot emission level.

The controller may be arranged to modify the fuel composition and/or flow rate to one engine, or one subset of the engines, relative to another engine, or another subset of the engines.

The controller may modify the exhaust flow of at least one engine relative to at least one further engine upon sensing of said condition by the one or more sensor.

The controller may independently and/or concurrently control the exhaust flow produced by the plurality of engines. The controller may instruct one or more engine to generate a different level of thrust and/or soot emissions to one or more further engine.

The controller may control the plurality of engines such that the total thrust produced by said plurality of engines satisfies or equals the aircraft thrust demand. The controller may control the plurality of engines such that one or more engine contributes a different proportion of the total aircraft thrust from one or more further engine, e.g. concurrently.

The controller may output an independent or individual control signal to each engine, e.g. concurrently, for control of the operation variable.

The controller may receive or determine a current, predetermined or optimal-efficiency operation variable value for the plurality of engines and may alter the operation variable value for each of the plurality of engines away from said current, predetermined or optimal-efficiency value, e.g. in response to sensing of the vapour trail formation condition.

A summation of the concurrent positive and negative changes to the operation variable for each engine on the aircraft may equal zero.

The controller may vary the thrust produced by each engine such that the thrust contribution by one or more engine on opposing sides of the airframe centreline is within a predetermined thrust threshold or threshold thrust difference, such as a thrust asymmetry threshold. A thrust asymmetry threshold may be predetermined or calculated by the controller. The controller may vary the thrust produced by each engine so as to balance the thrust contribution by one or more engine on opposing sides of the airframe. The invention beneficially allows the efficiency of one or more engine to be reduced in order to reduce the range of ambient conditions in which the engine can form a contrail, whilst ensuring that the aircraft thrust requirements are met.

Although airframe wake exerts a relatively weak effect on contrail formation, it can be applied at any time during contrail formation by the controller as required to reduce the climate impact of the contrails. It has also been found that varying of the engine operating point, and thereby influencing the engine efficiency, can also be used to provide a contrail suppression effect under certain ambient conditions. Thus the invention may be used not only to reduce the severity of contrail whilst forming but also to enable an aircraft to remain contrail-free at its current/desired flight-level under certain ambient conditions. Thus the invention may beneficially reduce the need to alter other aspects of engine operation and/or flight path to mitigate/suppress contrail formation.

The aircraft and/or propulsion control system may comprise a fuel delivery regulator arranged to receive fuel from a plurality of fuel sources. The controller may control the relative supply of fuel to the at least one engine so as to modify exhaust emissions, e.g. the relative fuel-flow rates from each of or a subset of the plurality of fuel sources. The controller may control operation of the regulator in dependence upon the sensed contrail condition. The controller may vary the volumetric flow rate or mass flow rate and/or ratio of fuels from the plurality of fuel sources supplied to the at least one engine. The ratio of fuels may comprise entirely one fuel, for example by way of switching fuel sources, or else a mixture of the fuels from the plurality of fuel sources.

Each fuel source may comprise a different fuel composition. The plurality of fuel compositions may each comprise a different aromatic content and/or specific energy. The controller may beneficially apportion the different fuels to better effect, e.g. to make best use of a scarcer fuel composition, as compared to a default, or more plentiful, fuel composition.

Each of the plurality of fuel sources may comprise a fuel tank. Each of the plurality of fuel sources may comprise a network of fluidly interconnected tanks. The plurality of fuel sources may be in fluid communication with the regulator.

The regulator may comprise a fuel blender or mixer. The mixer may output a substantially homogeneous fuel mixture comprising the fuels from the plurality of fuel sources. The regulator may comprise one or more regulator valve. The regulator may comprise an outlet, e.g. an outlet valve. The flow of fuel into the fuel blender or mixer may be controlled by a plurality of regulator valves. The regulator may comprise a plurality of individual regulators. The regulator may comprise one or more regulator for each of the plurality of fuel sources.

The controller may be configured to control the regulator(s) to deliver fuel to the engine according to one or more predetermined fuel composition, e.g. a specific energy, aromatic content or fuel ratio, threshold. A lower and/or upper threshold may be used which may comprise a static and/or dynamic threshold.

The controller may access one or more engine efficiency or soot emission model for the plurality of engines, which may comprise an engine efficiency plot, curve, formula, look-up table, database or the like. The controller may determine a new value of the engine operation variable for each engine in dependence on the engine efficiency model. An engine efficiency model may be determined or provided for each of the plurality of engines. An engine efficiency model may comprise a deviation from a standard or normal model for each of the engines.

The controller may undertake a search process to identify a value of the engine operation variable for one or more engine which satisfies a threshold or target value of a contrail characteristic for one or more engine. The controller may undertake a search process to identify a value of the engine operation variable which satisfies a threshold value of contrail characteristic with greatest efficiency, or minimum fuel consumption or efficiency degradation, e.g. across all the engines on the aircraft. Alternatively, the controller may determine or receive a threshold value of acceptable engine operation (e.g. according to an engine efficiency threshold) and may determine the maximum contrail reduction that can be achieved within said threshold.

The sensor may comprise one or more sensor for detecting actual or implied contrail formation. The sensor may or may not comprise one or more ambient condition sensor. The sensor may or may not comprise an engine operating condition sensor. The sensor may or may not comprise a contrail detection sensor, such as, for example an optical depth or acoustic sensor (e.g. a wave emitter/receiver).

The sensor may comprise one or more of an ambient temperature, pressure, light and/or humidity sensor. The sensor may or may not comprise an altitude sensor. One or more threshold value of a sensor reading may be used to control initiation/cessation of engine thrust control according to the invention. The controller may be arranged to vary the operation of each engine, e.g. away from its current, predetermined and/or optimal-efficiency setting, only in response to detected or implied contrail formation in a region of ice-super-saturated air and/or at night.

The controller may further be arranged to vary the operation of each engine, e.g. away from its current, predetermined, default and/or optimal-efficiency setting, only when the level of ambient ice super-saturation lies below a predetermined threshold.

The controller may be arranged to control engine operation according to the invention only in predetermined portions or phases of a flight, for example during cruise. One or more sensor may be used to determine the flight portion or phase. The one or more portion or phase may be identified according to altitude (or location) and/or engine operating point.

In examples of the invention, the controller may be arranged to receive a signal indicative of the level/volume of fuel aboard the aircraft, e.g. total fuel and/or volume of individual fuel compositions. The system may comprise one or more fuel sensor, e.g. for each or all fuel sources/tanks. The controller may be arranged to determine whether or not to modify engine operation for the purpose of contrail mitigation in dependence upon a fuel sensor output (e.g. based upon a fuel consumption requirement calculation for a remainder of the flight). The determination may be made based upon one or more fuel sensor output for one or a plurality of fuel compositions.

The controller typically comprises machine readable instructions, such as one or more module of code and/or control algorithm, for control of the engines and/or a fuel regulator with the aim of contrail mitigation for at least one engine.

According to a second aspect of the invention, there is provided a data carrier comprising machine readable instructions for operation of a controller of an engine control system in accordance with the first aspect. The data carrier may comprise a persistent memory or data carrier device.

According to a third aspect of the invention, there is provided a method of controlling one or more aircraft engine in accordance with the control system of the first aspect.

Any of the optional or preferable features defined in relation to the first aspect may be applied to the second or third aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

During operation of an aircraft engine, contrail formation can occur as engine exhaust gases mix with ambient air. The number density of condensation nuclei in the engine exhaust plume will influence the size distribution of ice crystals in the young contrail. Specifically, the greater the number density of condensation nuclei then the smaller will be the initial size of formed ice crystals (and the greater will be the optical depth of the contrail at that point). The persistence of a contrail once formed is influenced by ambient conditions, and, in particular the level of ice saturation of ambient air.

The term 'mitigation' is used herein to refer to the suppression of contrail formation and/or the advantageous modification of one or more contrail characteristic, for example contrail optical depth.

In essence, this invention achieves a contrail mitigation effect by selectively altering the exhaust emissions of each engine according to proximity to flow phenomena caused by the wake of the airframe. It has been found that the airframe wake, and particularly vortical flow downstream of the airframe, can influence the characteristics of a contrail by causing sublimation of ice mass from the surface of contrail ice particles, in some cases eliminating a significant proportion of a contrail's ice particles.

In one example of the invention, by promoting a contrail-inducing exhaust flow parameter for one or more engine closest to the relevant wake flow phenomena and correspondingly decreasing the contrail-forming exhaust flow parameter for one or more engine furthest from the relevant wake flow phenomena it is possible to cause a net contrail reduction for the aircraft as a whole. The contrail inducting parameter may comprise a number density of condensation nuclei exiting the engine, for example an initial number density of soot particles prior to mixing with ambient air.

Since such changes in engine operation will typically shift the engines away from a default or optimal efficiency state, it is proposed that the invention will be used selectively, only where contrails are determined to have a relatively large environmental impact, and/or where the achievable benefit is determined to outweigh the costs of use.

Furthermore the invention may cause the thrust produced by each engine to be varied and so the invention may require varying the thrust distribution across a plurality of propulsive engines of an aircraft in order to ensure a total aircraft thrust requirement is met. Thrust may be modified directly, e.g. as a control parameter by the controller. Alternatively, thrust may be modified indirectly, for example by controlling one or more other engine operation parameter which impacts on the thrust generated by the engine. The other parameter could comprise a combustion parameter such as fuel composition or flow rate, etc.

Figure 1:
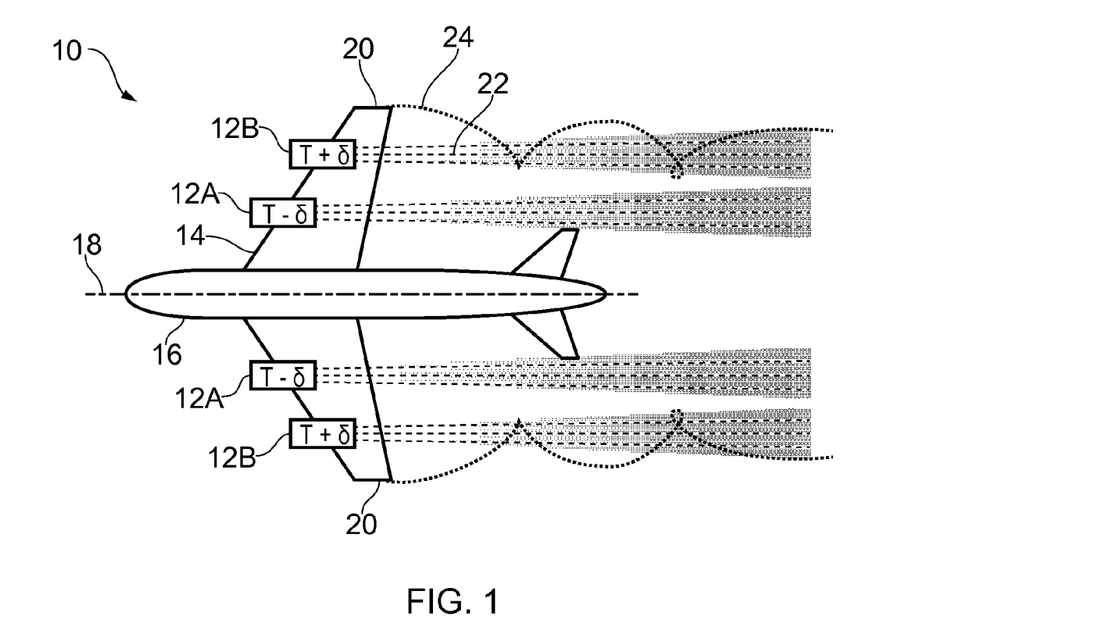
FIG. 1 shows a first example of an aircraft vapour trail control system operating according to the invention.

Turning now to FIG. 1, there is shown a conventional four-engine aircraft 10, in which the gas turbine engines 12 are mounted beneath wings 14. A first pair/subset 12A of the engines 12 can be defined for which the engines are relatively closer to the aircraft fuselage 16. The engines in a second pair/subset 12B are spaced further from the aircraft fuselage 16, i.e. further along the wings 14 in a span direction. The locations of the engines may be defined with reference to a centreline or central axis 18 of the airframe or else a spacing from a tip 20 of either wing 14.

During conventional aircraft operation, the engines 12 would each operate at substantially the same operating point so as to provide a substantially equal thrust, T, e.g. according to equal concurrent throttle settings. However, in the example of FIG. 1, it is shown that the thrust produced by each of the engines 12B is increased by a value, δ, whereas the thrust produced by each of the engines 12A is reduced by a corresponding value, δ. Thus the net thrust for the aircraft will be unchanged but the characteristics of contrails which form in the exhaust plumes 22 of the engines 12A and 12B will be modified as will be discussed in further detail below.

It is to be understood that the example of FIG. 1 applies to a scenario in which a reduction of contrail optical depth is considered advantageous and the variation of engine soot emission index with throttle setting is positive, that is to say that an increase or decrease in throttle setting will result respectively in an increase or decrease in engine soot emission index.

During operation, the exhaust plumes 22 of engines located sufficiently close to the wingtips 20 become at least partially entrained in the aircraft's wingtip vortices 24. Contrail-forming particles entrained in the vortices 24 are subject to adiabatic heating due to descent of the vortex. As a result, ice mass is lost from the surface of the ice particles via sublimation, leading to elimination of some of the particles having the smallest diameter/size, thereby leading to a reduction in the optical depth of the contrail downstream of the vortex region. This effect is particularly relevant on relatively large 4-engined aircraft for which the wingtip vortices are strong in nature due to the weight of the aircraft.

Ice particles entrained and retained within the wingtip vortices for the entire lifetime of the wingtip vortices constitute the aircraft's primary wake and are subject to greater heating. Ice particles which remain un-captured by wingtip vortices, and ice particles which become detrained from the wingtip vortices prior to vortex breakup, together constitute a secondary wake. The contribution of the outboard engines 12B to the secondary wake may be minimal depending on the precise location of the engines relative to the wingtip 20, whereas the contribution of the inboard engines 12A to the primary wake may be minimal, or at least significantly less than that of engines 12B, particularly when engines 12A are close to the aircraft's centreline 18.

Variation in pre-vortex ice particle size distribution can influence the particle size distribution, and hence the optical depth, of the post-vortex contrail. This is at least in part because pressure is typically lower than ambient pressure within the core of a vortex, and, as a result, the temperature is also lower. Therefore the relative humidity within the vortex core is higher than in the ambient air at least initially. If this relative humidity is such that the air within the vortex core is supersaturated with respect to ice, then any ice particles trapped within the core can grow as a result of a deposition process. However ice particle growth will reduce the level of super-saturation within the vortex core. Furthermore the vortex core will descend over time and hence experience adiabatic heating which further reduces the relative humidity within the vortex core and, if the reduction in relative humidity is sufficient to eliminate any super-saturation, there is a resulting loss of ice mass from the surface of the ice particles which therefore shrink, giving rise to a sublimation process.

Therefore contrail particles of smaller initial size/diameter are more likely to be completely eliminated within the wingtip vortex than larger contrail particles. This process is dependent upon the level of ambient air super-saturation, which determines the initial level of super-saturation within the wingtip vortex core and the extent of initial ice-particle growth before the adiabatic heating effects dominate. The vertical distance travelled by the vortex during its lifetime influences the degree of heating.

During vortex descent, any sub-saturation resulting from the adiabatic heating will result in sublimation of ice from the contrail particles in order to restore saturation. Saturation is restored once a given mass of ice has turned to vapour. The smaller the initial size of an ice particle, the less ice mass it must lose before it disappears altogether, and the lower the increase in humidity within the vortex core arising from its elimination.

Therefore, if the initially forming contrail, prior to entrainment in a vortex, features a greater number density of ice particles, it will contain a greater proportion of smaller ice particles and as a result a greater proportion of ice particles will be lost during adiabatic heating within the vortex. Hence the increase in optical depth, attributable to the greater initial number of ice particles, of the post-vortex contrail will be less than the increase in optical depth of the pre-vortex contrail. Accordingly, the invention proposes to vary the number of ice particles becoming entrained within the vortex flow relative to those contained within the secondary wake and thereby cause a net benefit in contrail optical depth for the aircraft as a whole.

For a particular engine, the invention varies the number density of pre-vortex contrail ice particles by influencing processes within the gas turbine engine. Such engine-driven processes may concern the engine exhaust emissions, for example the combustion process, which affects the soot content in the exhaust flow. The exhaust emissions, such as the particulates therein, create nucleation sites for condensation, which in turn affects the number of ice particles formed. The invention focuses on control of the engine operation, and particularly the combustion process, to control exhaust emissions. In particular the invention proposes varying control of the soot emission index of, and/or the rate of production of soot particles by, the engines onboard the aircraft.

Therefore, by altering the thrust/throttle setting for the engines 12 as shown in the specific example of FIG. 1, the soot emission index from the inboard engines 12A is reduced, while the soot emission index from the outboard engines 12B is increased. A reduction in the rate at which fuel is consumed in the combustion process in engines 12A causes less water vapour to be produced by the engine per unit distance travelled. There is also a reduction in the number density of soot particles for the inboard engines 12A leading to reduced numbers of condensation nuclei. This reduction is due not only to the reduction in fuel-flow rate to the inboard engines 12A but also due to the reduction in the number of soot particles produced per unit mass of fuel consumed by the inboard engines 12A. As a result fewer ice particles are formed in the exhaust plume, leading advantageously to a reduction in contrail optical depth and, potentially, a shorter contrail lifetime.

For the outboard engines 12B, there is an increase in the number density of emitted soot particles (i.e. due to an increase in the volume of fuel consumed and/or the number of soot particles produced per unit mass of fuel) and the water vapour emitted by the engine per unit distance travelled. However the relatively strong influence of the wingtip vortex on the exhaust flow of those engines 12B causes many of the ice particles to be eliminated and so the relative increase in post-vortex ice-particle number-density is lower than the relative increase in pre-vortex ice-particle number density. Thus a net benefit in contrail optical depth reduction can be achieved upon vortex dissipation for the aircraft as a whole, even if there is a slight penalty by way of increase in optical depth on the outboard engines 12B. The ratio between the two effects and the corresponding benefit is dependent upon the regime of engine operation as will be discussed below.

Figure 2:
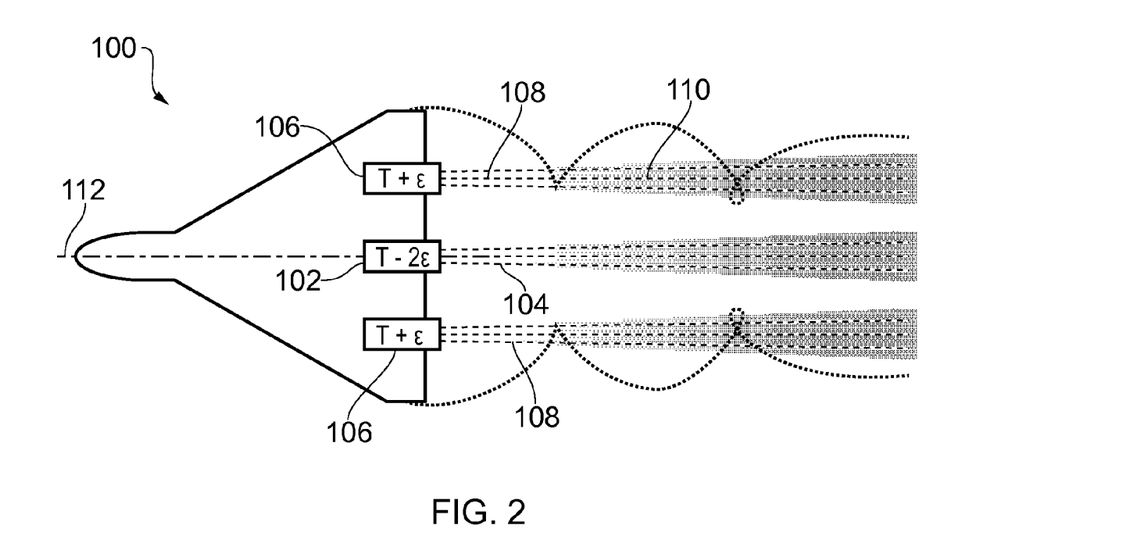
FIG. 2 shows a second example of an aircraft vapour trail control system operating according to the invention.

Turning now to FIG. 2, which refers to a similar operational scenario to that of FIG. 1, there is shown a three-engined aircraft 100. An inboard engine 102 produces an exhaust plume 104, while two outboard engines 106 produce exhaust plumes 108. As in the example of FIG. 1, contrails may form at a position behind the engines indicated schematically at 110, although it is to be understood that neither of FIGS. 1 and 2 are to scale.

In an example of operation of the present invention, the thrust distribution is modified by changing the thrust produced by each of the outboard engines from T to and by changing the thrust of the inboard engine from T to T-2E, where E is positive. Total thrust is therefore unchanged, and the symmetry of thrust about the aircraft's centre line 112 is unchanged.

The impact upon contrail optical depth for the outboard engines is largely as described above in relation to FIG. 1. Although, as there is only one inboard engine 102, in this case lying on the centreline 112, it receives a larger reduction in throttle and/or fuel flow rate, and hence soot emission index. Furthermore, the inboard engine 102 lies further from the wingtips and so the interaction of its exhaust plume 104 with the wingtip vortices is likely to be very weak. This can increase the effectiveness of the present invention due to a greater distinction between the behaviour of inboard and outboard contrails.

In any of the above examples, if the thrust adjustment for any engine(s) is large enough, contrail formation from the engine(s) may be suppressed altogether.

The processes described above for contrail mitigation in accordance with the invention are most effective when the ambient ice super-saturation level is modest, i.e. for values of relative humidity over ice, RHi, of greater than 100% but close to 100%. The invention is particularly useful if RHi is greater than 100% by only a relatively small amount, for example by less than 20% or 10%. However it is also possible that some benefit from the invention may be achieved at larger RHi values but which are less than or equal to 130% or 140%. In some embodiments, any of such values may be used as a threshold for deciding whether or not to alter engine operation in accordance with the invention.

Figure 5:
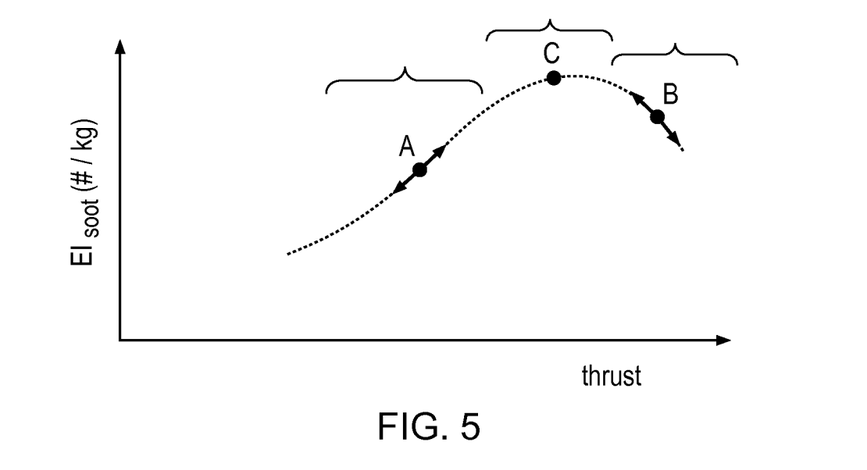
FIG. 5 shows a schematic plot of engine soot emission index against thrust.

Turning now to FIG. 5, there is shown an example chart schematically indicating dependency of soot emission index (i.e. the number of soot particles produced per kg of fuel burned) of an engine as a function of the engine operation variable controlled in accordance with the invention, i.e. thrust/fuel-flow-rate/throttle-setting or the like. This example dependency is characterised by:

a first regime of operation, exemplified by a region surrounding point A, in which the gradient is positive and of a magnitude which lies above a first predetermined threshold;

a second regime of operation, exemplified by a region surrounding point B, in which the gradient is negative and of a magnitude which lies above a second predetermined threshold;

a third regime of operation, exemplified by a region surrounding point C, in which the gradient is low in magnitude, being either 1) positive and of a magnitude lying below the first predetermined threshold, or 2) negative and of a magnitude lying below the second predetermined threshold.

The arrows in FIG. 5 indicate the variation in soot emission index arising from variations in throttle-setting/fuel-flow-rate/thrust in accordance with the present invention.

Irrespective of the above regimes of operation, a small increase or decrease in fuel-flow rate will cause a corresponding increase or decrease in the amount of water vapour emitted by the engine per unit distance of travel. Since the emission index of water vapour is independent of the fuel-flow rate, and since aircraft speed is intended to be unchanged by control changes implemented according to the invention, then the percentage change in water vapour emitted per unit distance of travel is directly proportional to the change in fuel-flow rate to the engine.

However, in the first regime of operation, the soot emission index increases with increasing with throttle and so the rate of change of the number density of condensation nuclei caused by increasing throttle is greater than the rate of change of the emitted water vapour per metre of travel.

In the second regime of operation, the soot emission index increases with decreasing throttle. As a result, the magnitude of the rate of change of the number density of condensation nuclei is greater than the magnitude of the rate of change of the emitted water vapour per metre of travel.

In the third regime of operation, the gradient of soot emission index curve is lower and so the change, in the amount of water vapour emitted per condensation nucleus, will be smaller for a given efficiency penalty. A number of competing factors make the outcome predictable only with a more detailed analysis. Examples of the calculation process for a suitable control scheme are set out below to allow a controller to identify whether there is an achievable benefit by use of the invention.

In view of the above discussion of FIG. 5, it will be appreciated that for some operating conditions of the engines, the reverse of the throttle modification described in FIGS. 1 and 2 will be implemented, for example whereby the thrust/throttle setting of the outboard engines will be decreased and the thrust/throttle setting of the inboard engine(s) will be increased accordingly.

The present invention takes account of the balance between the above effects when calculating when, in which direction, and/or to what extent thrust adjustments should be made. At times when contrail modification is unnecessary or is deemed undesirable, then a default thrust distribution corresponding to the prior art thrust distribution is applied. The changes in engine operation are managed by a controller to ensure that the thrust demand for the aircraft is met, i.e. by increasing thrust output of one or more engine and decreasing thrust output of one or more further engine so that the total/collective thrust output of the engines remains unchanged. The decision-making and control mechanism is outlined below.

Whilst the examples of the invention described herein relate to control of a throttle setting for each engine to control thrust and/or exhaust emissions of the engines, it will be understood that the precise operation variable for the engine that is used for control may vary between different implementations of the invention. For example, conventional throttle levers in the cockpit may be used to determine the thrust/throttle demand for each engine from the cockpit. However the actual sensing and/or control of a thrust setting will typically be implemented using one or more operation variable for the engine, which is indicative of, or related to, a thrust setting. The operation variable could comprise any or any combination of: fuel flow rate to an engine; a fuel-to-air ratio for combustion; an engine shaft rotational speed, such as low-pressure shaft speed; and/or a pressure ratio between different locations with respect to the engine or a portion thereof. A number of other possible operation variables could potentially be used as a proxy for thrust/throttle or exhaust emissions when implementing the invention and the terms "thrust" or "throttle" as used herein should be construed accordingly.

Figure 3:
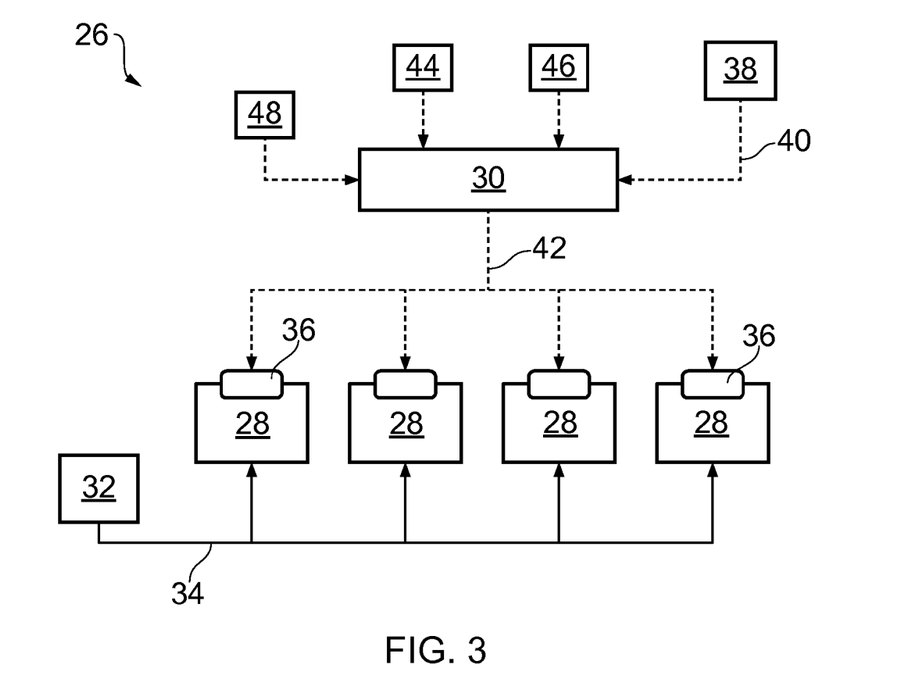
FIG. 3 is a diagrammatic representation of an aircraft-based control system according to an example of the invention.

Turning now to FIG. 3, there is shown one arrangement of a control system 26 according to the invention for coordinating engine emissions and throttle/thrust distribution over a plurality of engines 28. Dashed lines are used to indicate signals between the relevant system components.

The controller 30 is the decision making unit central to the present invention. The decision making unit 30 comprises one or more processor arranged to co-ordinate the thrust and emission levels between the engines 28 in accordance with the invention.

Each of the plurality of engines 28 draw fuel from a fuel source 32, which could comprise one or a plurality of fuel tanks, via one or more fuel line 34, under the control of an engine control unit 36. In this example, the controller 30 is common to a plurality of engines on the aircraft so as to coordinate contrail mitigation for the aircraft as a whole. Thus controller 30 is in communication with, and can instruct a suitable operation variable, such as a throttle setting, for each engine control unit 36 either individually or collectively. The local engine control unit 36 on each engine then instructs or controls the engine operation variable values in accordance with the instruction by the controller 30.

38 represents central or cockpit control systems for the aircraft, thus dictating the aircraft propulsion requirements. The propulsion requirement output by 38 takes the form of a control signal 40 representative of the total thrust requirement of the aircraft and/or a thrust/throttle setting for each engine 28. Typically the control signal 40 will comprise a plurality of thrust signals corresponding to the position of a plurality of throttle controls, e.g. levers, within the cockpit. Signal 40 typically comprises a throttle setting for each engine which will be substantially equal in normal/default operating conditions.

The controller 30 receives signal 40 and determines, according to contrail mitigation requirements, whether, and by what extent, to alter the emissions and/or thrust contribution of each engine by adjusting each engine's throttle setting away from the setting stipulated in signal 40. The controller thus outputs a resulting throttle control signal 42, comprising an individual thrust setting for each engine 28, which may selectively depart from the thrust settings instructed by signal 40 received from the cockpit.

The controller 30 preferably only applies contrail mitigation control in accordance with the invention in a selective manner. That is to say, the controller 30 will acknowledge whether a higher level demand on the aircraft thrust will override any contrail mitigation attempt. This may form part of a contrail mitigation policy but may otherwise be enacted by inhibiting contrail mitigation control by controller 30 during certain portions of a flight, such as take-off, climb out, descent/approach or else during other manoeuvres for which thrust control is paramount. One or more altitude sensor, engine operating point or operating condition sensor may be used to distinguish between scenarios or flight portions in which contrail mitigation should/should not be attempted.

An ambient condition sensor, or sensor array, 44 is arranged to output real-time or near-real-time information concerning any or any combination of the ambient pressure, temperature, light level and/or humidity of air through which the aircraft is flying. Any such sensor signal is received by controller 30 and may be used in determining whether, in which direction, and/or to what extent, to alter engine throttle settings. In another example, one or more of those sensors 44 may optionally be replaced and/or supplemented by remote sensing equipment for sensing ambient conditions at a location on the planned flight path for the aircraft prior to the aircraft arriving at said location.

A database of forecast data (e.g. obtained prior to the flight and/or updated periodically during the flight via radio-link or similar) which details the ambient condition(s) that the flight will encounter along its proposed flight routing and altitude profile, taking account of the expected time at which each point of the proposed route will be passed. Depending on the different embodiments of the invention, only one or a subset of the above ambient conditions may be used.

In one example, a contrail detection sensor may be used to trigger contrail mitigation action and/or to verify a determination of the presence or absence of a contrail. A suitable sensor may comprise an optical depth sensor. A source of illumination may also be provided on the aircraft and directed towards at least one region downstream of the engines to illuminate at least part of the field of view of the optical depth sensor. The sensor would be configured to detect electromagnetic radiation of at least one wavelength emitted and/or reflected by the vapour trail in response to energy emitted from the source of illumination. In other embodiments, instead of illumination, an emitter of sound (or ultrasonic) waves could be provided. The sensor would then be configured to detect the sound returned from the ice particles in the young contrail. Such a sensor may be considered an example of one of the ambient sensors 44 described above. Additionally or alternatively, readings from ambient sensors for temperature, pressure and/or humidity may be used to infer whether a contrail is forming with or without verification by a specific contrail detection sensor. Such inference may take account of engine throttle/efficiency at the current operating conditions and the properties of the fuel being used.

The system also comprises one or more engine operation sensor 46 for each engine arranged to output real-time or near-real-time readings of the engine operating point and/or the operation variable values used for the control of throttle by the controller 30 in accordance with the invention.

The controller 30 has access to one or more data store 48 comprising resources required by the controller to determine whether, in which direction, and/or to what extent, to implement changes to engine throttle settings in accordance with the invention. Any reference to a 'model' made herein is a reference to a data/information source defining impact on one or more variable with variation of one or more further variable. Such models may comprise one or more database, lookup table, chart or computational model (e.g. comprising one or more algorithm or mathematical formula) as required.

An example of the process operated by the controller 30 for deciding suitable control of the engines 28 is described with reference to FIG. 4. A decision-making process 50 proposes a value for a throttle-modification parameter 52 (whose magnitude corresponds to δ or ϵ in the examples of FIGS. 1 and 2 described above) in dependence upon the following:

Knowledge of the regime of operation (e.g. first, second or third regimes A, B or C described above), as determined by the regime identifier 54. The regime identifier compares the default throttle setting to a model defining the dependency of soot emission index upon engine fuel-flow rate (or throttle setting, or thrust setting) at the current ambient conditions. If the engine(s) are determined to be operating in the first regime of operation, then the controller 30 will be limited to positive throttle modification parameter values if the aim is to reduce contrail optical depth for the aircraft as a whole, or will be limited to negative throttle modification parameter values if the aim is to increase contrail optical depth for the aircraft as a whole (as will be discussed in further detail below). Alternatively, if the engine(s) are determined to be operating in the second regime of operation, then controller 30 will be limited to negative throttle modification parameter values if the aim is to reduce contrail optical depth for the aircraft as a whole, or will be limited to positive throttle modification parameter values if the aim is to increase contrail optical depth for the aircraft as a whole. If it is determined that the engine(s) are operating in the third regime of operation, then the throttle modification parameter may take either positive or negative values. Alternatively the throttle modification parameter may be allowed to take positive and/or negative values irrespective of the determined regime of operation.

Knowledge of some or all of the previous values 52 proposed and, optionally, the corresponding level of desirability calculated for each of them Safety limits which may for example limit the available extent of proposed thrust modifications (e.g. no more than a predetermined percentage either side of the value requested by the cockpit) and/or which may place bounds on the resulting proposed thrust.

In one example, the determination of a proposed value for the throttle modification parameter 52 could be performed by an optimisation algorithm, for example using information about the desirability of previously-evaluated proposals when determining its next proposal. Alternatively the determination could comprise a sweep through the range of acceptable values.

The proposed value for the throttle-modification parameter 52 output by process 50 is fed to process 55 which, in dependence upon information concerning the number of engines of each subset or category (i.e. inboard/outboard engines), translates the proposed value for the throttle modification parameter 52 into a collection of values 56 representing a proposed throttle adjustment for each of the engines and/or engine categories. A source of information 58 concerning the number of engines in each category may be provided.

Process 60 comprises one or more calculation algorithms or routines used by the controller 30 to assess the benefit of a proposed modification to the operation of the engines in each category. It receives the collection of proposed throttle adjustment values 56 as an input and outputs a determination for each engine or each category of engines to a total or net benefit determination process 62. The process 62 combines the results of process 60, taking account of the number of engines in each category. In one embodiment the results could be combined by summation. In another embodiment account could be taken of the merging of contrails from adjacent engines, or other such factors, when determining the combined impact. The process 62 thus outputs an assessment of the level of desirability of the proposed value for the throttle-modification parameter 52.

A termination test 64 determines whether a further iteration is required based upon the desirability of the output of 62. Thus a control determination process or routine may be iterated in time sequence so as to arrive at a final control solution for the current operating conditions. The throttle settings corresponding to the most advantageous throttle modification parameter value 52 discovered during the iterative process are supplied to the engines 28 as signals 42. In the event that there is no throttle modification parameter value that yields an advantage over the default/input thrust settings 40, then the signals 42 will be identical to the signals 40.

Figure 8:
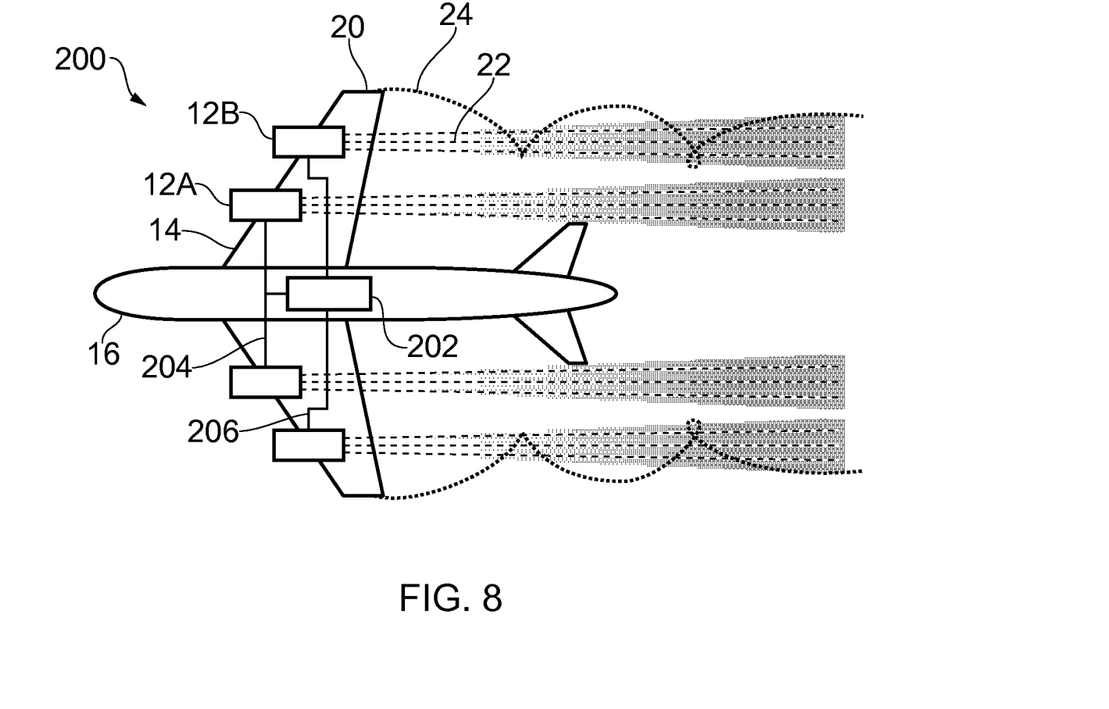
FIG. 8 shows a schematic view of an aircraft comprising a fuel system according to another example the invention.
Figure 9:
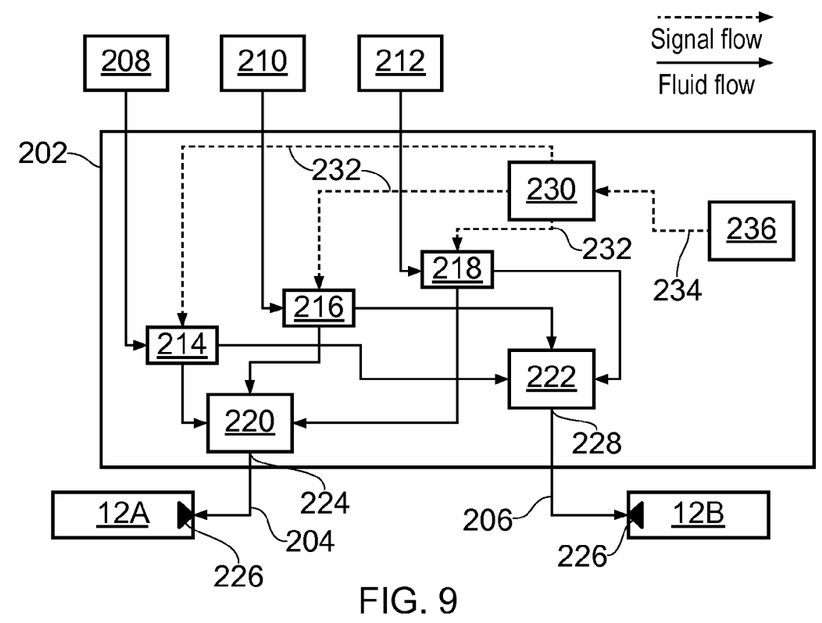
FIG. 9 shows a first example of an aircraft fuel system according to the invention.
Figure 10:
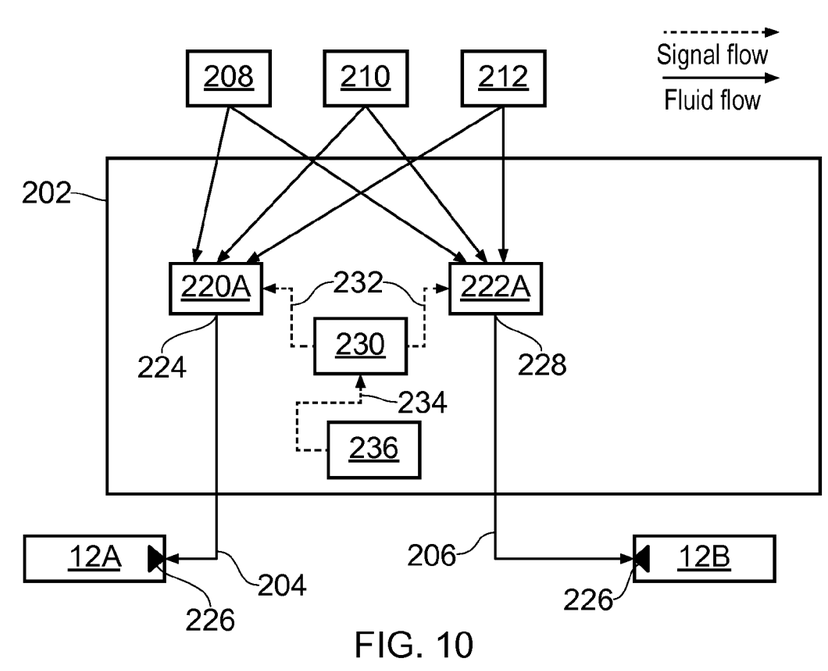
FIG. 10 shows a second example of an aircraft fuel system according to the invention.

Other examples of systems accommodated by the present invention are shown in FIGS. 8 to 10, which may replace or else be used in conjunction with the examples of FIGS. 1 to 3. Such examples are relevant to aircraft having two or more aviation fuel-types stored on board and where there is a significant difference in specific energy (or gravimetric energy density—i.e. chemical energy per unit mass) or volumetric energy density between the stored fuel types. In such a system one of the fuel types typically produces less soot than the other when burned in an engine. Additionally or alternatively there may be a significant difference in the availability of those fuel types, for example with one fuel type being available in smaller amounts than another on board the aircraft. One of the fuel types may be a default fuel, such as kerosene, with a further fuel comprising for example, liquid natural gas (LNG) or a biofuel. Other conventional alternatives to kerosene or blends of kerosene with one or more further fuels may be used as the further fuel, typically offering lower soot emissions than standard kerosene. Biofuels typically offer slightly higher specific energy than kerosene, with minimal difference in volumetric energy density, whereas LNG has significantly higher specific energy but significantly lower volumetric energy density.

In such a system, in addition to, or instead of modifying the thrust/throttle settings of the inboard engines relative to the outboard engines, the controller may modify the fuel composition/blend supplied to each engine or group of engines. Prioritisation of fuel use for particular engines may be determined, at least in part, according to the extent to which changes in soot emission index influence post-wingtip-vortex contrail optical depth, which in turn is dependent upon engine operating point, engine location relative to a wingtip of the aircraft and upon ambient conditions. Prioritisation of fuel use may also be determined in part by the influence of ambient temperature over alternative nucleation mechanisms for contrail particles.

FIG. 8 shows an aircraft 200 according to an example of the present invention, in which like features have been given like numerals and will not be described again. The aircraft fuel system 202 is configured to supply a fuel composition to the inboard engines 12A via fuel pipes/lines 204, and concurrently to supply a fuel composition to the outboard engines 12B via fuel pipes/lines 206. For much of the flight, e.g. when no contrails are forming, those fuel compositions may be identical. However, when contrail mitigation is required, the two fuel compositions may be adjusted (using methods explained below) so as to be different from one another.

In contrail forming conditions of the kind described herein, a first fuel composition supplied to the inboard engines 12A may be adjusted such that the production of soot particles by the inboard engines 12A is reduced, leading to a lower optical depth of any resulting contrails. A second fuel composition supplied to the outboard engines 12B may not be adjusted such that the outboard engines burn the default fuel, typically having higher soot emissions.

A higher proportion of the contrail ice particles produced by the outboard engines is eliminated within the wingtip vortex 24 and so the additional benefit which could be realised through altering the second fuel composition in lines 206 is smaller than the potential benefit that can be realised through adjusting the first fuel composition in lines 204. A strong interaction of an exhaust plume with the wingtip vortex can, depending upon ambient ice super-saturation levels, have a diluting effect on any changes that might be made to the pre-vortex contrail ice particle number density. Changes to the fuel composition to affect the pre-vortex ice particle number density are therefore prioritised when the degree of ice particle elimination within the wingtip vortex is low (e.g. when the ambient ice super-saturation level is fairly high). This can lead to more effective use of the available fuel compositions for contrail mitigation.

Although the example of FIG. 8 shows a 4-engined aircraft, it will be appreciated that the principles described above could apply to any other aircraft engine configuration described herein.

FIGS. 9 and 10 show different examples of the fuel system 202. There is a plurality of fuel tanks 208, 210, 212 on the aircraft (a tank being a single tank or alternatively a network of fluidly interconnected tanks), each tank being fluidly isolated from the other tank(s). Each tank comprises a type of fuel or alternatively a fuel blending composition for mixing with a fuel to form a resultant composition that can be burned within an engine.

Fuel passes from the tanks 208, 210, 212 via regulators 214, 216, 218 respectively, to blenders 220 and 222. The relative rates at which fluids from the tanks 208, 210, 212 are admitted by the regulators determines their relative proportions within the fluid mix passed to the blenders 220 and 222. Blender 220 has an outlet 224 which supplies fuel via a fuel pipe 204 to one or more fuel injector 226 of one or more inboard engine 12A. Blender 222 has an outlet 228 which supplies fuel to one or more fuel injector 226 of one or more outboard engine 12B.

The arrangement allows each engine or group of engines to be supplied with a fuel composition specific to that engine or group of engines.

The regulators receive signals 232 from a control unit 230, which may or may not be akin to, or part of, the controller 30 described above. The signals specify the relative proportions of each of the blending components or fuels (contained in the individual tanks 208-212) that should be blended together to form the first fuel composition, for engine(s) 12A. The signals 232 also specify the relative proportions of each of the blending components or fuels that should be blended together to form the second fuel composition, for engine(s) 12B. The controller 230 receives input 234 from a collection of sensors 236 of the kind described herein.

Error! Reference source not found.10 shows an alternative arrangement in which the function of the regulators is incorporated into the blenders 220A and 222A.

In some examples, the fuel blenders could be omitted, and the regulated fuel flows of the distinct fuel types could be transmitted directly to the fuel injectors, mixing being carried out as a result of turbulent flow within the engine's combustor. In the event that the plurality of fuel compositions comprise fuels having properties that are significantly different (such as kerosene and LNG), it may be necessary for the different fuel types to be introduced to the engine's combustor via distinct types of fuel injector.

Figure 4:
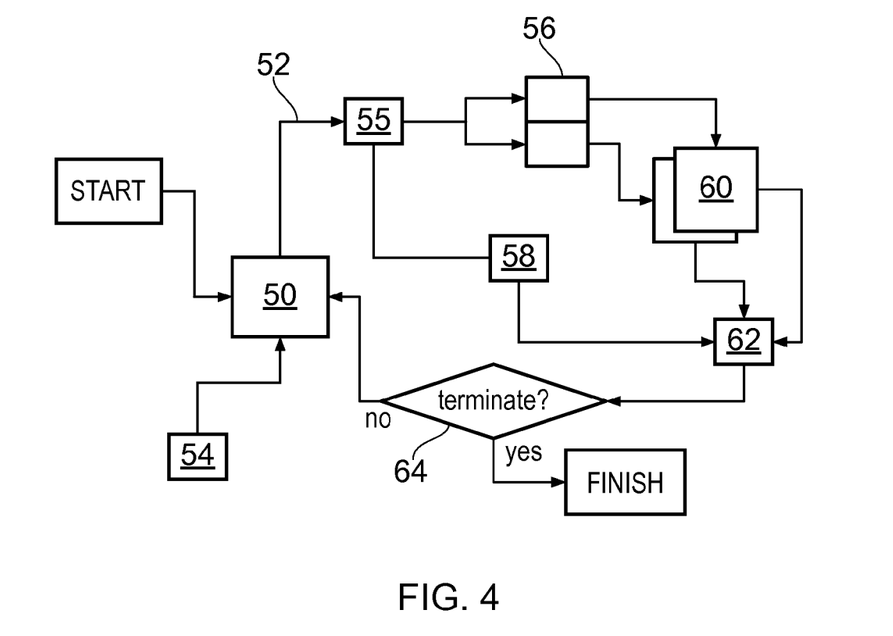
FIG. 4 is a flow diagram of a control process for contrail mitigation according to one example of the invention.

For the examples of FIGS. 8 to 10, the controller 230 may operate in a manner similar to that of controller 30 as shown in FIG. 4. Accordingly a common control procedure can be followed so as to accommodate both throttle variation and/or fuel composition or indeed any other combustion parameter which it is desirable to control to alter the exhaust flow of individual engines.

For the examples of FIGS. 8 to 10, the decision-making process 50 of FIG. 4 proposes trial values for the fuel compositions, in addition to, or instead of throttle modification parameters 52 such that 56 comprises a collection of values of proposed fuel composition adjustments. The range of trial fuel composition values that may be proposed may be constrained by relevant safety or specification limits (e.g. no more than 25% aromatic content and/or optionally no less than 8% aromatic content). The determination of a proposed fuel composition distribution could be performed by an optimisation algorithm (which may use information about the desirability of previously-evaluated proposals when determining its next proposal), or else could comprise a sweep through the range of acceptable values in order to find an optimal fuel composition according to the control considerations. A sweep may provide an acceptable approach in this case because the search-space has low dimensionality.

In other examples, upper and lower thresholds could be applied regarding the total rate of consumption of a non-default fuel, for example based on knowledge of a predetermined flight path, so as to manage in a computationally simpler fashion relevant fuel distributions across the various stages of a flight.

In the example of fuel composition control, processes 60 in FIG. 4 comprise processing the relevant inputs to assess the benefit of a proposed fuel composition modification to the operation of the engines in each category and 62 conveys to the decision-making process an assessment of the level of desirability of the proposed fuel compositions 56. The same termination test 64 is used and the fuel compositions corresponding to the most advantageous values discovered during the iterative process are supplied to the engines.

In the event that there is no set of fuel compositions that yields an advantage over the default fuel compositions, then the engines are provided with the default fuel compositions. Furthermore, as with the engine throttle settings, in the event that contrail mitigation is not deemed necessary, the default fuel composition will be used in accordance with a normal mode of engine control.

In a simplistic example of fuel composition control, the use of low-soot producing fuel could be limited solely to the engines furthest from the wingtip vortex, i.e. the inboard engines, during contrail mitigation. This would greatly simplify the control considerations. A development of this simple implementation may comprise limiting the use of low-soot-producing fuel to periods of higher ice super-saturation (e.g. lying above a threshold value of RHi, for example 115%, 120% or 130%). Additionally, the use of the low-soot-producing fuel on all engines may be permitted for low ice-super-saturation conditions but limited to engines with least vortex interaction during high ice super-saturation conditions. Various different implementations are thus available depending on how plentiful non-standard engine fuel is and/or the implications of its use for engine efficiency.

Figure 6:
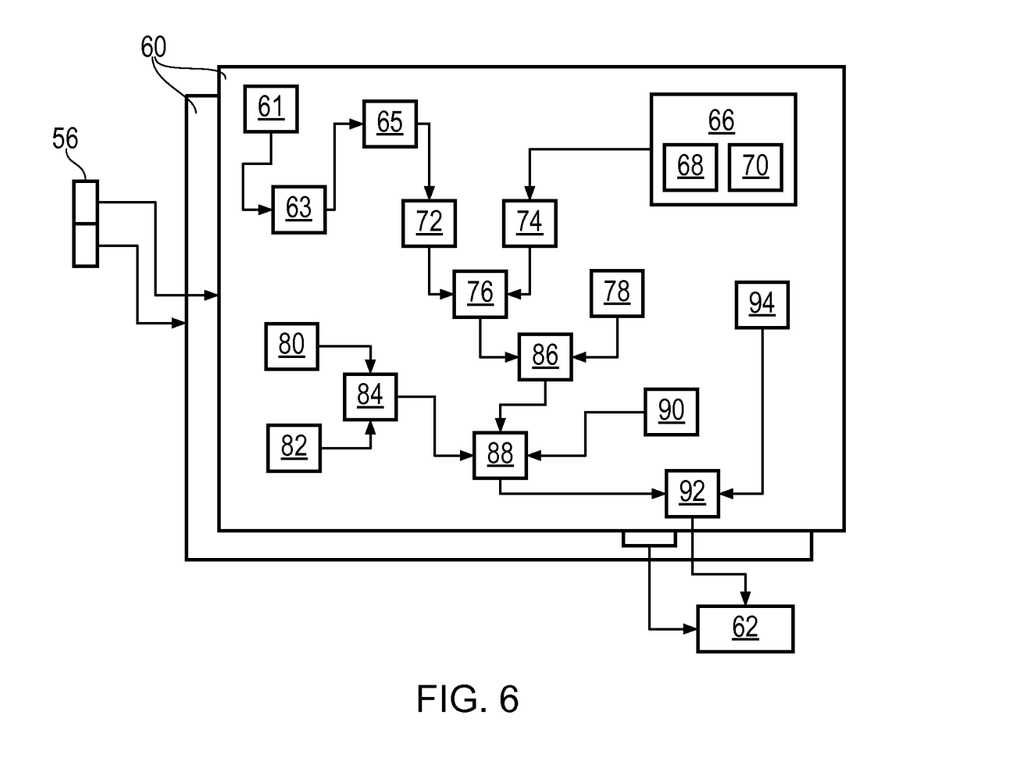
FIG. 6 is a flow diagram of a control process for determining or assessing achievable contrail mitigation according to an example of the invention.

Turning to FIG. 6, there is shown a method for assessing the benefit of a proposed set of engine combustion adjustments 56 (i.e. throttle and/or fuel composition) for the engines to be performed at process 60 in FIG. 4. It is to be understood that certain data items, such as ambient pressure, ambient temperature, and/or ambient relative humidity, are available to any or all of the calculation steps within the process 60, as required. The default engine combustion settings, e.g. according to command signals 40, and/or proposed throttle/fuel adjustments for each category of engine may also be available to any or all of these calculation steps, as required. It will be understood that, for a particular engine or category of engines, by combining the appropriate value from the default/input settings 40 with the corresponding value from the collection of proposed modifications to throttle/fuel settings 56, a proposed throttle setting and/or fuel-flow for the engine or category of engines can be determined to enable interrogation of various models described below.

The collection of proposed modifications to throttle/fuel settings 56, containing one value for each category of engine, is an input to the routines 60. The routines 60 comprise a collection of calculation steps for each engine or each category of engine to assess the net benefit associated with applying a proposed modification to the throttle and/or fuel setting.

The routine accesses a model 61 from which can be determined an engine's soot emission index under the current ambient atmospheric conditions, in dependence upon the proposed engine settings(s).

63 is a model from which can be determined the number of soot particles emitted by an engine per unit distance travelled, in dependence upon engine throttle or fuel-flow rate/composition, aircraft speed, and the determined soot emission index.

65 is a model from which can be determined the initial particle size distribution of ice particles formed in the exhaust plume of an engine, in dependence upon ambient temperature, ambient pressure, ambient humidity, and the number of emitted soot particles per unit distance of travel, and the mass of water vapour emitted by the engine per unit distance of travel (the last being calculated from engine throttle/fuel-flow, aircraft speed and fuel properties).

66 is a model which determines the altitude reduction which will be achieved by the wingtip vortex prior to its breakup. This model may comprise: a model 68 which determines the lifetime of a wingtip vortex in dependence upon such factors as the strength of ambient turbulence, the rate of change of ambient temperature with altitude, and/or the instantaneous aircraft weight (e.g. taking account of the amount of fuel burned so far during the flight); and/or a model 70 which determines the downward velocity of a wingtip vortex, in dependence upon factors including the instantaneous aircraft weight, and aircraft configuration.

72 is a model which determines the particle size distribution of ice particles initially captured within the wingtip vortex core, given the initial particle size distribution of a newly formed contrail, in dependence upon the location of the corresponding engine relative to the wingtip. That is to say, model 72 determines the extent to which particles in the engine exhaust become captured by the wingtip vortex.

74 is a model which determines the temperature change likely to be experienced within the vortex core as a result of the determined change in altitude during its descent and/or the speed of its descent, in dependence upon ambient temperature and pressure. Model 74 may receive or access the output of model 66.

76 is a model which, when supplied with an initial ice particle size distribution, determines the number or ratio of ice particles which remain after the adiabatic heating experienced within the wingtip vortex core during the lifetime of the wingtip vortex. The remaining ice particles also include those ice particles which were detrained from the vortex prior to its breakup. The number of surviving ice particles may be determined in dependence upon the estimate, produced by the model 74, of the temperature change attributable to descent of the wingtip vortex, taking account of ambient pressure, temperature and humidity.

78 is a further model from which can be determined the proportion, of those ice particles not captured/retained by the wingtip vortex core, which experience sufficient adiabatic heating in the region of downwash between the aircraft's wingtip vortices so as to be eliminated.

80 is a model from which can be determined the strength and orientation of incoming sunlight over the expected lifetime of the contrail in the post-vortex regime. 82 is a model from which can be determined the albedo of surfaces (including other clouds) which would receive incoming sunlight in the absence of a contrail formed by the aircraft.

84 is a model which determines the time-integrated radiative forcing due to short-wave (i.e. cooling) effects over the expected lifetime of the contrail, e.g. in dependence upon the values determined by models 80 and 82.

86 is a model which determines the time-integrated radiative forcing due to long-wave (i.e. warming) effects over the expected lifetime of the contrail, in dependence upon values determined by models 76 and 78.

88 is a model which determines the operational or financial net benefit of the difference between 1) the determined short-wave and long-wave effects and 2) reference short-wave and long-wave effects, for example in dependence upon a table or other resource of operational/financial cost penalties 90. The reference short-wave and long-wave effects are calculated assuming default engine thrust settings 40 using the same procedure as above.

94 is a model which determines, for a single engine, the operational cost of additional/alternative fuel burn and/or any additional maintenance penalty associated with applying for a specified period a proposed engine combustion control setting. The cost is determined in dependence upon the extent to which the proposed control setting differs from that which would be employed in the absence of this invention, in other words the difference between a proposed setting(s) and the default setting(s).

The values produced by models 88 and 94 are then combined (for example by addition) within process 92 to provide an assessment of the net benefit, for a single engine, attributable to the proposed throttle/fuel modification value 56 for that engine and/or for the engine category to which that engine belongs.

The above routine is performed for each engine or engine category and the outputs passed to the net benefit determination process 62 which is described above.

Whilst a specific example of a calculation routine is described above in relation to FIG. 6, that example is intended only to indicate the multiple considerations that may be needed to come to an assessment about the perceived benefit of proposed control changes for the engines. In various other embodiments it is possible that certain steps in the routine 60 may be approximated, amalgamated or otherwise simplified in a manner that better suits a working embodiment of the invention.

In another example of the invention, the routine 60 could be at least in part replaced by implementing the proposed throttle/fuel adjustment values 56 (i.e. by the controller 30 instructing the relevant settings on the engines) and observing the formed contrails by measuring one or more contrail optical property which would then inform a calculation of any benefit obtained. In such an example, the contrail detection sensor may be used to determine the optical depth of a contrail in the post-vortex regime. Observation/measurement could additionally or alternatively be made remotely (e.g. via satellite or ground-based optical equipment) with the results communicated to the aircraft. Accordingly, a search process performed by the controller could comprise a model-based/theoretical search or else a trial-based search as required.

Figure 7:
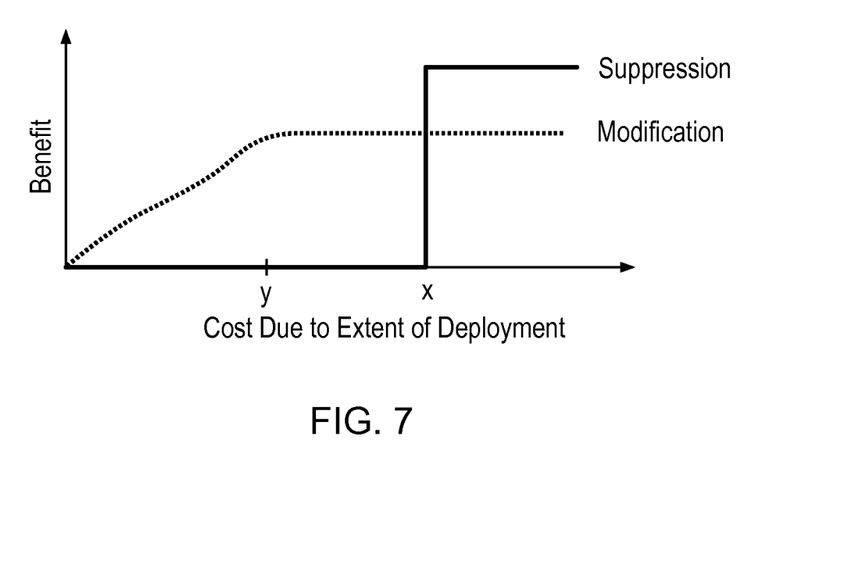
FIG. 7 shows a schematic plot of the contrail mitigation benefits achievable using a control system according to an example of the invention.

Turning now to FIG. 7, there is shown a schematic plot of benefit against the operational cost of contrail mitigation. As discussed above, the benefit will comprise assessment of the reduction in climate warming impact of the contrail due to operation of the invention, whereas the cost will account for the operation of the engine(s) at non-optimal thrust/efficiency during contrail mitigation. In a general sense, the greater the extent of deployment of the throttle/thrust redistribution between the engines according to proximity to the wingtip, the greater the cost associated with that extent of deployment. The operational cost according to fuel composition changes may be more or less pronounced depending on the type of substitute fuel used. The 'cost' factors may thus take account of the availability and financial cost of alternative fuel supplies. The relationship between operational cost and benefit need not be linear but in general it can be assumed that the cost is a monotonically increasing function of the extent of deployment.

The contrail modification approach described herein will yield a non-zero benefit at low levels of deployment but will reach a maximum benefit under the exhaust flow mechanisms described above that is typically less than the benefit possible through complete suppression of the contrail. However it is also to be noted that engine efficiency in itself will have a separate impact on contrail formation. For certain ambient conditions a degradation in engine efficiency can, in itself, completely suppress contrail formation, irrespective of the wake flow effects described herein. Therefore it is possible that thrust/throttle redistribution by the controller could completely suppress contrail formation for one or more of the engines rather than just modify the characteristics of contrails that are formed. This is demonstrated in FIG. 7, wherein the dashed line represents benefits associated with contrail modification and the solid line represents benefits associated with total contrail suppression.

For contrail suppression, in general terms there will be a point X at which suppression is achieved and below which a contrail-suppression approach yields lithe or no benefit. Similarly, substantially zero additional benefit beyond that available at point X can be achieved by increasing the extent of deployment.

If, under a particular set of operating conditions, point X lies beyond the maximum achievable level of deployment, then a contrail-suppression approach is not feasible and a contrail-modification approach, such as that set out in the present disclosure, is more advantageous. Furthermore, if X lies within the capabilities of a contrail-suppression system but is considered unacceptably high, for example because the level of resource required to achieve point X would leave insufficient resource for other parts of the flight, then a contrail-modification method would be most appropriate. Finally, if the benefit/cost ratio of at least some levels of deployment of a contrail-modification method exceeds that of the contrail-suppression method at a level of deployment corresponding to point X, then the modification method may be more attractive.

However if the point X is achievable under the current operating conditions and yields greater benefit, then the controller 30 may select and implement the contrail suppression control, e.g. by instructing throttle redistribution values relating to point X, rather than the perceived optimal values at point Y using only a contrail modification approach.

In view of the above discussion, it will be appreciated that the invention can usefully be combined with other contrail mitigation control schemes or methodologies to provide a wider range of contrail mitigation control that can accommodate a larger number of contrail formation scenarios. A key advantage of the present invention is that it does not require complex equipment or modification of a conventional gas turbine engine design, nor does it increase the weight of the engine and so can easily be combined with other contrail mitigation techniques. For example, the invention may reduce the number of instances in which an aircraft may need to be redirected to avoid contrail formation and/or may reduce the distance/altitude by which an aircraft's route may need to be adjusted. Additionally or alternatively the invention may be used in conjunction with one or more further contrail mitigation system, for example allowing extra contrail-mitigation capability when other methods have reached their own limits.

In any of the above examples, the assessment of climate warming impact would primarily take into account one or more of the following factors: likelihood of contrail persistence; the balance between day-time and night-time over the contrail life; the temperature of the ambient air in which the contrail will reside. During the day, contrails reflect a proportion of incoming sunlight away, leading to a climate cooling effect which is at least partially offset against the climate-warming impact associated with the absorption by contrails of heat radiating upward from the planet's surface. During the night, however, the cooling effect is not operative. For this reason a contrail's climate warming impact (per unit time of contrail existence) is typically greater during the night than during the day. It is estimated that, globally, night-time flying accounts for some 40% of total flying miles, but for some 60% of aviation's total contrail-related climate warming impact. The climate warming impact of a contrail is also influenced by its temperature such that a contrail forming in colder air will exert more of a climate warning effect than an equivalent contrail that forms in slightly warmer air.

In order to best offset any additional fuel burned under the invention, it is proposed that contrail mitigation could operate only when contrail persistence is possible e.g. according to sensing that ambient air is ice supersaturated (ISS), and/or during the night. However various different sub-sets of all contrails may be selected in order to offer a different balance between the system variables and, accordingly the policy may take into account any one or more of the above-discussed conditions/parameters.

Whilst the above embodiments focus primarily on a reduction in contrail optical depth in order to reduce the environmental impact of contrails it is possible that the climate cooling impact of contrails formed during the day could bring about a net environmental benefit. In such circumstances it may be beneficial to promote contrail formation, i.e. to increase—rather than reduce—contrail optical depth. Thus it will be appreciated by the skilled person that the above described throttle/fuel adjustments could be reversed for a contrail promotion regime. That is to say, the throttle/fuel could be adjusted to reduce contrail formation for one or more engine for which the engine exhaust flow has a relatively stronger interaction with the wing tip vortex. The throttle/fuel setting could be adjusted to promote contrail formation for one or more engine for which the engine exhaust flow has a relatively weaker interaction with the wing tip vortex.

Accordingly it may be considered a common feature of the different modes of operation that involve thrust adjustment to apply a thrust modification on one or more engine, or subset of engines, concurrently with a thrust modification on one or more further engine, or subset of engines, of substantially equal magnitude but in an opposing sense, e.g. taking account of the cardinality of each of the respective subsets of engines.

In an embodiment in which contrail formation is promoted, the invention will be most effective when the ambient ice super-saturation level is modest, i.e. for values of relative humidity over ice, RHi, of close to 100%. Thus suitable ambient sensors may be used to determine current values of RHi.

Regardless of whether a contrail optical depth increase or decrease is to be achieved, any example of the invention may account for incoming sunlight in determining the environmental impact of a contrail, and thus whether, in which direction, and/or by what extent to modify engine thrust settings. This may be achieved using an ambient light sensor and/or by reference to a clock (for example in conjunction with a daylight look-up table for the current location of the aircraft) in order to determine whether a contrail will exist/persist in daylight or else in the dark.

Since some embodiments may incur a slight reduction of engine efficiency due to the alteration of for example throttle setting, it will introduce an increased fuel-burn. However this penalty is directly linked to the change to engine efficiency when the contrail mitigation is active and is incurred only for a small proportion of the flight. Thus the increased fuel burn is easily predicted and less severe than it might initially appear to the skilled person. From a climate-change perspective, the reduction in climate warming impact achieved through contrail mitigation can be tailored through the control methods discussed above to outweigh the increased $CO_2$ or other exhaust emissions resulting from this invention's operation.

In various examples of the present invention, it is considered pertinent to disable the contrail mitigation system during one or more flight phase, such as during take-off, climb and/or approach, where emergency situations may demand that more thrust is commanded quickly, whilst still maintaining engine operation within acceptable ranges of temperature and shaft-speeds.

Usage of the contrail mitigation system may additionally or alternatively be disabled if the additional volume of fuel required for its operation would jeopardise the safe completion of the flight to the intended destination, taking account also of the requirement to maintain fuel reserves e.g. for holding, diversions and go-arounds. Accordingly, in some examples of the invention, it may be beneficial to calculate or estimate in advance of a flight the total amount of one or more fuel composition required for the flight, taking account of potential/expected contrail mitigation requirements. In any such example a proposed flight may be divided into a number of sections, each corresponding to an engine operating condition. From the contrail mitigation prediction for each flight section is determined the amount of additional fuel necessary to fulfill that contrail mitigation requirement for that operating condition, taking account of expected thrust level, fuel composition and duration of the operating condition. A summation over the various operating conditions/flight sections can then be performed to provide the total mass or volume of additional fuel which should be loaded onto the aircraft prior to the flight. A simpler metric could be applied based on flight duration and proposed cruise altitude.

It may also be necessary to monitor fuel burn against a predicted fuel burn for the flight or each section thereof to ensure that there is at all times sufficient fuel remaining to complete the flight whilst maintaining the necessary reserves as described above. Accordingly, a minimum fuel threshold level, below which contrail mitigation cannot be implemented for the flight or a particular section thereof may be determined in advance and/or monitored dynamically in flight. A dynamic threshold fuel level would have a high value at the beginning of a flight and would reduce as the flight progresses to reflect the fuel requirement for the remainder of the flight.

The invention claimed is:

1. An aircraft propulsion control system comprising:
   a plurality of gas turbine engines mounted at different spaced positions relative to an airframe;
   one or more sensor arranged to sense a condition indicative of a property of a vapour trail formed by an exhaust flow from one or more of the plurality of engines; and
   a controller arranged to be responsive to said sensed condition and a thrust demand for the aircraft and selectively to control operation of each of the engines so as to modify the exhaust flow of at least one engine relative to at least one further engine according to the positions of the engines on the airframe relative to one or more portion of the airframe that induces a vortical wake flow during flight.

2. An aircraft propulsion control system according to claim 1, comprising three or more gas turbine engines.

3. An aircraft propulsion control system according to claim 1, wherein the controller assesses the flow interaction between the exhaust flow and the vortical wake flow for the at least one engine and the exhaust flow of the at least one engine is modified by the controller according to the outcome of said assessment.

4. An aircraft propulsion control system according to claim 1, wherein at least one engine is laterally spaced from an airframe centreline by a greater distance that at least one further engine.

5. An aircraft propulsion control system according to claim 1, wherein the exhaust flow of the at least one engine is modified by the controller according to the proximity said at least one engine to a wing tip, relative to a further engine.

6. An aircraft propulsion control system according to claim 1, wherein the controller is arranged to modify the content and/or flow rate of at least one engine exhaust flow in response to a condition indicative of vapour trail formation.

7. An aircraft propulsion control system according to claim 6, wherein the controller is arranged to control one or more engine operation variable so as to modify the throttle, efficiency and/or soot emissions of said at least one engine.

8. An aircraft propulsion control system according to claim 7, wherein the controller is arranged to concurrently increase the one or more operation variable on at least one engine and decrease the one or more operation variable on at least one further engine.

9. An aircraft propulsion control system according to claim 1, wherein the modification of the exhaust flow of at least one engine by the controller comprises controlling different levels of thrust output between the at least one engine and the at least one further engine according to the positions of the engines on the airframe.

10. An aircraft propulsion control system according to claim 1, wherein the controller accesses one or more engine thrust, efficiency or soot emission model and modifies the operation of each engine away from a normal or optimal efficiency setting in dependence upon said model.

11. An aircraft propulsion control system according to claim 1, wherein the controller undertakes a search process to identify a value of an engine operation variable for one or more engine which satisfies a threshold or target value of a contrail characteristic for one or more engine.

12. An aircraft propulsion control system according to claim 1, wherein the sensor comprises one or more ambient condition sensor and/or a contrail detection sensor.

13. An aircraft propulsion control system according to claim 1, wherein the controller determines a likelihood of persistence of a vapour trail formed under the sensed condition indicative of vapour trail formation and selectively modifies the exhaust flow of the one or more engine in response to said determination.

14. An aircraft propulsion control system according to claim 1, wherein the sensed condition comprises a level of ice super-saturation in ambient air.

15. An aircraft propulsion control system according to claim 1, wherein the controller adjusts the fuel composition delivered to the at least one engine relative to the at least one further engine responsive to said sensed condition.

16. An aircraft propulsion control system according to claim 15, comprising a plurality of fuel sources on board the aircraft, each fuel source comprising fuel of a different fuel composition, and a fuel delivery regulator arranged to receive fuel from a plurality of fuel sources, the controller being arranged to control operation of the regulator so as to vary the fuel composition delivered to the at least one engine.

17. A data carrier comprising machine readable instructions for operation of a controller of an engine control system to:
receive sensor readings indicative of a vapour trail formation condition by an exhaust flow from one or more of a plurality of gas turbine engines mounted at different spaced positions relative to an airframe;
receive a thrust demand signal for the aircraft; and
selectively output control signals to each of the engines so as to modify the exhaust flow of at least one engine relative to at least one further engine according to the positions of the engines on the airframe relative to one or more portion of the airframe that induces a vortical wake flow during flight.

18. An aircraft propulsion control method, comprising:
receiving at an aircraft engine controller sensor readings indicative of a vapour trail formation condition by an exhaust flow from one or more of a plurality of gas turbine engines mounted at different spaced positions relative to an airframe;
receiving a thrust demand signal for the aircraft at the aircraft engine controller; and
processing the received readings and thrust demand signal and selectively outputting control signals to modify the exhaust flow of at least one engine relative to at least one further engine according to the positions of the engines on the airframe relative to one or more portion of the airframe that induces a vortical wake flow during flight.

* * * * *